United States Patent [19]

Carnewal et al.

[11] Patent Number: 4,846,198
[45] Date of Patent: Jul. 11, 1989

[54] MODULAR COMBINE HARVESTER

[75] Inventors: José A. C. L. Carnewal, Eeklo; Georges M. Mesure, Zedelgem; François Van Herpe, Houtem, all of Belgium

[73] Assignee: Ford New Holland, Inc., New Holland, Pa.

[21] Appl. No.: 68,082

[22] Filed: Jun. 29, 1987

[30] Foreign Application Priority Data

Jul. 1, 1986 [EP] European Pat. Off. ...... 86201152.5

[51] Int. Cl.$^4$ ............................................. A01F 7/00
[52] U.S. Cl. .................................... 460/21; 56/14.6; 460/8; 460/68; 460/100
[58] Field of Search ........... 56/14.6; 130/27 R, 27 D, 130/27 E, 27 F, 27 B, 24, 25, 26

[56] References Cited

U.S. PATENT DOCUMENTS 4,150,525  4/1979  De Busscher et al. ....... 130/27 R X

FOREIGN PATENT DOCUMENTS 1457964   4/1969  Fed. Rep. of Germany .
1782012   7/1971  Fed. Rep. of Germany .
1544188   4/1979  United Kingdom .
1580350  12/1980  United Kingdom .

OTHER PUBLICATIONS

West German Gebrauchsmuster No. 7725843, published 11/24/77.

Primary Examiner—Stephen F. Husar
Attorney, Agent, or Firm—Larry W. Miller; Frank A. Seemar; Darrell F. Marquette

[57] ABSTRACT

A combine harvester is disclosed wherein the operative components thereof are built according to a modular concept. The combine harvester includes a threshing module, a separating module and a cleaning module, all of which are supported by a frame and operably interconnected. Each respective module is interchangeable with a like module having a different configuration.

11 Claims, 5 Drawing Sheets

MODULAR COMBINE HARVESTER

BACKGROUND OF THE INVENTION

The present invention relates generally to harvesting machines, commonly referred to as combine harvesters and, more particularly, is directed to combine harvesters built according to a modular concept.

In known combine harvesters, grain is threshed and separated in a threshing and separating mechanism and the separated grain, together with the impurities, such as chaff, dust, straw particles, and tailings, is fed to a cleaning mechanism for cleaning. Clean grain is collected below the cleaning mechanism and fed to a grain tank for temporary storage. The tailings are separated from the clean grain and impurities for reprocessing. This reprocessing either involves recycling the tailings through the threshing and separating mechanism or treating them in a separate tailings rethreshing means.

In the standard commercially available combines, the rotatable threshing cylinder and cooperable concave extend transversely to the direction of movement of the combine. The crop is fed to the concave and passed between the concave and threshing cylinder whereby it is threshed. The straw is discharged rearwardly of the concave onto reciprocating or oscillating straw walkers that extend longitudinally of the combine. Much of the grain contained in the crop material fed to the threshing mechanism is threshed and separated by that mechanism and some of the remainder is separated from the straw while the latter is on the straw walkers. Straw walkers have proved to be the capacity limiting components of the standard combine because, when operating at high capacity rates, much grain is discharged with the straw to the straw walkers which are unable to cope with the required separation, and hence unacceptable grain losses occur Recent developments in combine harvesters have led to so-called rotary machines wherein both threshing and separating are accomplished in mechanisms comprising rotary components cooperable with respective stationary threshing and separating concaves and grates. In rotary combines the crop material is subjected to a much more aggressive and positive separating action during a relatively prolonged period of time, whereby the efficiency of a rotary combine harvester usually is greater than that of a conventional machine.

Several different types of rotary combine harvester have appeared on the market and in one such machine a conventional transversely-extending, threshing mechanism having a threshing cylinder and a cooperable concave is combined with a rotary separating mechanism having a rotor of a width greater than that of the threshing mechanism and disposed parallel thereto with its end extending transversely past the respective ends of the threshing mechanism. The rotary separating mechanism operates spirally to convey the crop material received from the threshing mechanism towards each of its end, while submitting the crop to a separating action. With such a separating mechanism, the incoming layer of crop material has to be divided in two substantially equal portions, each of which is then spirally conveyed from the center of the separating mechanism to one or other of its ends.

In another type of rotary combine, commonly referred to as an axial flow combine harvester, the threshing and separating mechanism extends longitudinally (fore-and-aft) of the machine, parallel to the direction of movement and comprises at least one threshing and separating rotor and cooperable concave. The crop material is fed to the forward end of the threshing mechanism and is formed into a mat which passes generally axially therethrough in a spiral path. In axial flow machines, the crop material is subjected to a threshing and separating action far longer than in a standard machine of comparable size and, therefore, the efficiency of the former is greater than the efficiency of the latter.

It has been proven in practice that the conventional combines and the rotary combines both have advantages and disadvantages which influence the end user's buying decision. Accordingly, there is a market for both conventional and rotary combines.

Turning now to the cleaning apparatus of both conventional and rotary combines, it is readily appreciated that the efficiency of a cleaning system of a combine harvester is greater if threshed crop material is fed thereto in a regular manner and the cleaning air blast is uninterrupted. As a rule, this is achieved only if the combine harvester is in a virtually horizontal position. When the ground is irregular, and particularly when inclined, different things can happen in the cleaning mechanism dependent on a number of factors, such as the direction and extent of the inclination of the combine to the horizontal. When the combine harvester is oriented such that it is inclined to the horizontal transversely in relation to the direction of travel, crop material separated from the straw in the threshing and separating means tends to move to the lower side of the grain pan. This sideward shifting of crop material is continued during its transport along the grain pan, during its transfer from the grain pan to the cleaning sieves, during its movement across the cleaning sieves and during its fall from one sieve to another sieve disposed therebelow. The result of all this is that the higher sides of the sieves are virtually free of crop material while the lower sides thereof are so heavily loaded with crop material that clogging may occur. This, in turn, results in grain emerging from the combine harvester at the rear instead of passing through the sieves and causing considerable grain losses at the lower side of the sieves. With uneven loading of the sieves, the cleaning air blast is unequally effective, so that cleaning is diminished considerably. Indeed, cleaning air tends to escape through the underloaded sieve sections, thus leaving the overloaded sieve sections with a reduced air blast.

One solution to this problem has been given by the provision of an automatically self-leveling cleaning apparatus such as disclosed in Great Britain Pat. No. 2,052,238. Other solutions equally are available on the market. It will be appreciated that farmers will want such a self-leveling cleaning apparatus only when they have to operate their combine in hilly conditions. Otherwise, the additional cost for such an apparatus is not warranted.

All the foregoing means that, to be able to meet all customer requirements, a manufacturer would have to offer a very wide range of combine models, which is economically undesirable, especially in times when the market for combine harvesters is in a downturn and pressure on prices is high.

SUMMARY OF THE INVENTION

It is an object of the present invention to overcome the aforementioned problems of the prior art by providing a combine harvester utilizing interchangeables modular components.

According to the invention, a combine harvester is provided comprising:

a header adapted for receiving crop material from the field;

threshing means for threshing crop material received from the header and separating grain therefrom;

separating means disposed to receive threshed crop material from the threshing means and operable to separate further grain from the crop material which has not previously been separated therefrom by the threshing means;

cleaning means positioned to receive threshed and separated grain from the threshing means and the separating means and operable to separate clean grain from discardable crop material;

grain storage means operable to temporarily store clean grain received from the cleaning means;

a power source operatively coupled to the various machine components for driving said machine components; and an operator's station with controls for enabling the operator to control the harvesting operation; the combine harvester being of a modular design and including at least a threshing module, a separating module and a cleaning module detachably connected to each other in an operational manner; and each module is being interchangeable with a like module having a different configuration.

BRIEF DESCRIPTION OF THE DRAWINGS

A combine harvester embodying the present invention will now be described in greater detail, by way of example, with reference to the accompanying drawings, wherein.

DETAILED DESCRIPTION OF THE PREFERRED EMBODIMENT

The terms "forward", "rearward", "left" and "rights"used in connection with the combine harvester and/or components thereof are determined with reference to the direction of forward operative travel of combine harvester but should not be considered as limiting. Also, the terms "grain", "straw" and "tailings" are used principally throughout this specification for convenience and it should be understood that these terms equally are not intended to be limiting. Thus "grain" refers to that part of the crop which is threshed and separated from the discardable part of the crop material which is referred to as "straw". Incompletely threshed ears are referred to as "tailings".

With reference to all of the figures, the combine harvester comprises a base unit which basically consists of the entire machine less the header 1 and the straw elevator 6. The header as shown in the drawings is commonly referred to as a grain header, but could be of any other type such as a corn header or a windrow pick-up attachment, depending on the type of crop and the condition of the crop to be harvested. The header 1 is detachably mounted on the forward end of the straw elevator 6 and includes a conventional cutterbar 2 positioned at the forward end and a header auger 3 rearwardly thereof to sever standing crop material to transversely consolidate the harvested crop material and to convey this crop material through an outlet 4 disposed centrally in the rear wall of the header 1 into the straw elevator 6. The header 1 also includes a conventional reel 5 to convey crop material across the cutterbar 12 to the auger 3.

The straw elevator 6 is mounted at the forward end of the base unit generally in operative communication with the threshing portion thereof and can be vertically pivoted relative to the base unit by means of hydraulic lifting cylinders (not shown) to raise and lower the header 1. The elevator 6 comprises a box-like framework of generally rectangular cross-section and houses conveyor means (not shown) which, in use, are operable to convey crop material received from the header 1 to the threshing means 7.

The base unit of the combine harvester includes threshing means 7, separating means 8 and cleaning means 9. The threshing means 7 are operable to thresh crop material fed thereto, such as wheat, corn, rice, soybeans, rye, grass seed, barley, oats or other similar crops, whereby the grain, seed or the like, is loosened and separated from the straw, stalks, coils or other discardable part of the crop. The separating means 8 receive threshed crop material from the threshing means 7 and subject said crop material to a further separating action whereby grain not already separated from the rest of the crop material in the threshing means 7 is separated therefrom in said separating means 8. Grain which has been separated from the straw in the threshing means 7 and the separating means 8 is conveyed to the cleaning means 9 which is operable to separate chaff and other impurities from the grain on the one hand and to separate unthreshed or incompletely threshed material (known in the art as "tailings") from the clean grain on the other hand. Cleaned grain is then elevated into a graintank 10 and the tailings either are returned to the threshing means 7 for a repeat threshing action or are subjected to a renewed threshing action in separate tailings rethresher means whereafter said tailings are recycled through the cleaning means 9.

The base unit further also comprises a power source 11 which is operatively coupled to the various machine components for driving these components and to the combine propulsion means for making the combine harvester mobile. The combine harvester normally comprises a front pair of traction wheels 12 and a rear pair of steerable wheels 13. An operator's station 14, often provided within an operator's cab 15 and including an operator's seat 16 and all necessary controls, is located generally at the forward end of the base unit and at a raised position so as to enable the operator, when positioned on the operator's station, to overview the harvesting operation of the header 1. The combine harvester also includes a strawhood 17 which is attachable to the rear of the machine.

Figure 1:
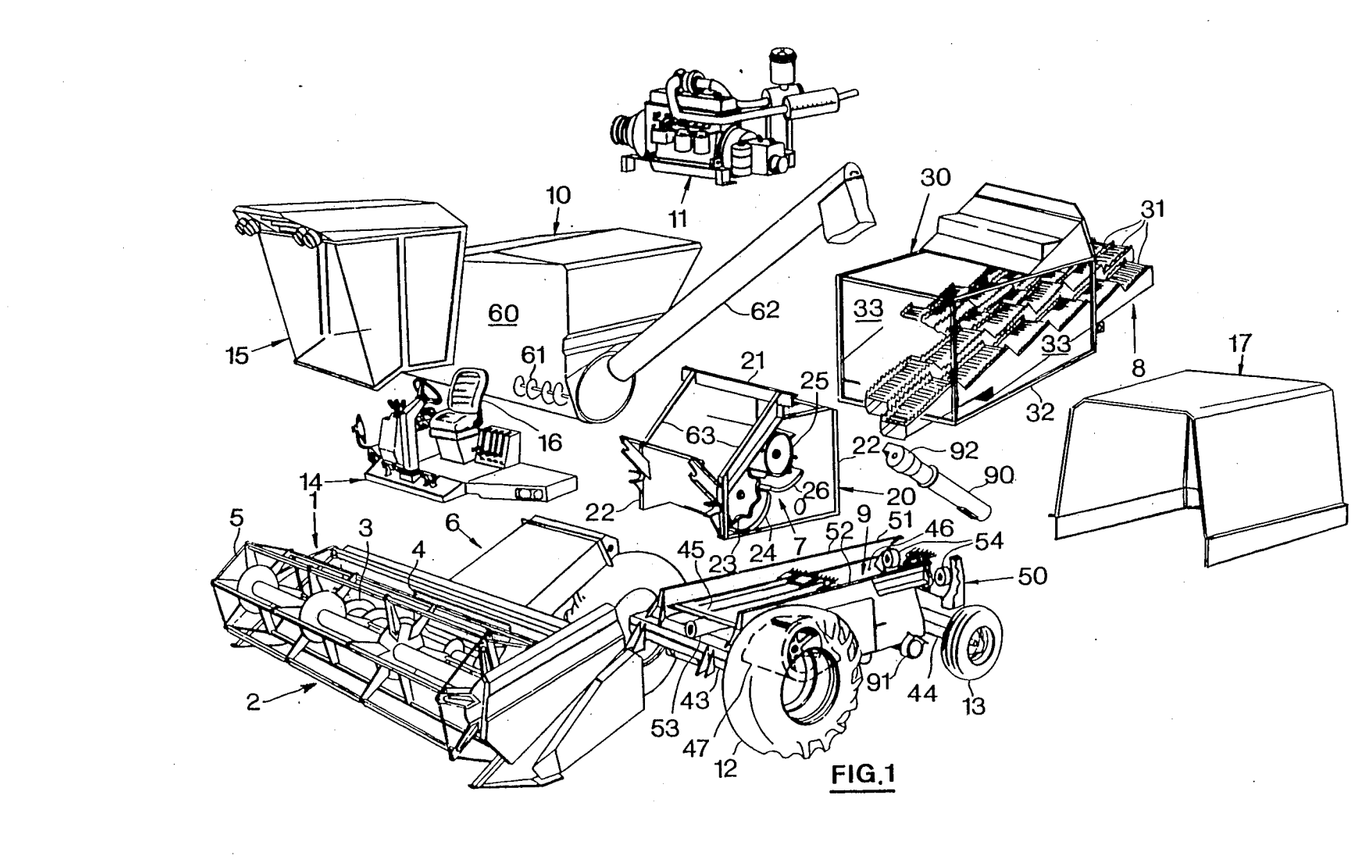
FIG. 1 is a schematic perspective "exploded" view of a combine harvester built according to the modular concept and embodying a first particular combination of specific individual modules.

The instant invention is concerned basically, but not exclusively, with the threshing means 7, the separating means 8 and the cleaning means 9 which are provided in modules, said modules being interchangeable with other modules comprising respectively different types of threshing means 7, separating means 8 and cleaning means 9. With reference to FIG. 1, a combine harvester is shown having threshing means 7, the separating means 8 and the cleaning means 9.

Considering first the threshing means 7, it will be seen that these are provided within a threshing module 20 which is arranged to be detachably mounted on top of a cleaning module 50 at the forward end thereof. To this end, the threshing module 20 has a framework 21 of a width corresponding to the width of the cleaning module framework 51 and comprise side walls 22 which are attachable to the respective fore-and-aft main beams 52 of the cleaning module 50. The threshing means 7 in the threshing module 20 comprise a conventional threshing cylinder 23 which is cooperable with a conventional threshing concave 24. This concave 24 extends generally circumferentially around a portion of the threshing cylinder 23 at a small distance therefrom to define a gap therebetween through which, in use, crop material is urged in a generally rearward direction while subjecting said crop material to a threshing action.

The threshing means 7 further also comprise a so-called straw deflector beater 25 which is rotatably mounted within the threshing module 20 in parallel and crop receiving relationship with the threshing cylinder 23 and rearwardly thereof. The beater 25 is rotatable in the same direction as the threshing cylinder 23 and is cooperable with a stationary deflector beater grate 26 mounted therebelow. The deflector beater 25 and associated grate 26 are operable to receive threshed crop material from the threshing cylinder 23, to deflect the path of movement thereof and to direct it to a further crop processing component in the machine while subjecting it to a further threshing action. Threshed grain is separated through the threshing concave 24 and the grate 26 and is allowed to fall onto the cleaning means 9 in the cleaning module 50 therebelow.

The threshing means 7 as described above and comprising the threshing cylinder 23 and concave 24 together with the deflector beater 25 and associated grate 26 possibly are the simplest, least expensive and most commonly used threshing means which are known since many decades and which have been fully satisfactory in most circumstances.

The framework 21 of the threshing module 20 is adapted for attaching to the top thereof the graintank module 10, which, except for the fact that it is also built according to the module concept, is fully conventional and basically comprises a tank body 60, a grain tank unloading auger 61 and an unloading tube 62. The tank body 60 is adapted to be detachably connected to the sidewalls 22 of the threshing module framework 21 which have upper edges 63 which are shaped to match with said body 61. The framework 21 of the threshing module 20 is also adapted for detachably coupling thereon at the forward end thereof the header and the straw elevator combination 1 to 6 and the module of the operator's station 14, which, as already mentioned, may be completed with the operator's cab module 15.

The modules forming the grain tank, the operator's station eventually completed with the operator's cab, the header and the straw elevator as used in the combination shown in Fig. 1 also may be used in other combinations, some of which have been shown in FIGS. 2 to 5, although it also will be appreciated that anyone or more of these modules may be interchangeable with modules of a different type. As an example different size grain tank modules 10 may be available to accommodate the end user's wishes.

Turning now to the separating means 8 shown in FIG. 1, it will be seen that these are formed by a plurality of conventional straw walkers 31 which are mounted for generally back-and-forth oscillatory movement in the lengthwise direction of the machine within a separating module 30 including a framework 32. The framework 32 has the same width as the framework 51 of the cleaning module 50 and the framework 21 of the threshing module 20 so that the separating module 30 matches with the threshing module 20 and the cleaning module 50. The side walls 33 of the framework 32 are detachably connectable to the rear portions of the main beams 52 of the cleaning module 50 at the upper edge thereof and to the rear edges of the side walls 22 of the threshing module 20.

When the separating module 30 is mounted within the combine harvester, the straw walkers 31 thereof have their forward ends in crop receiving relationship relative to the straw deflector beater 23 and associated grate 24 and, in use, are operable to convey threshed crop material thereover for ultimate discharge from the machine at the rearward end thereof while subjecting said crop material to a further separating action to separate further grain loosened from the ears but not already separated from the rest of the crop material in the threshing means 7. It will be seen from FIG. 1 that the forward ends of the straw walkers 31 extend forwardly beyond the forward edges of the framework 32 in a manner to project into the threshing module 20 when mounted on the combine harvester. In operation, separated grain is allowed to fall from the separating module 8 onto the cleaning means 9 in the cleaning module 50 for further processing.

The separating means 8 in the form of straw walkers 31 are simple and rather inexpensive in design; however, the separating capacity thereof is rather limited. Sometimes, this type of separating means is found to be the capacity limiting factor of a combine harvester. Accordingly, there are end users who consider straw walkers to be old fashioned; however, many other end users consider them to be reliable and to have an advantage over rotary separating means to the extent that straw walkers treat straw more gently than rotary separating means which produces less short straw and results in a more moderate loading of the cleaning means 9. For these reasons, straw walkers may be found to be ideal separating means for brittle straw conditions which prevail in certain areas of the world, such as the southern part of Europe. Straw walkers may also be considered to be the ideal type of separating means in those circumstances where threshed straw has an appreciable value to the extent that straw walkers indeed produce better quality straw which is more easily baled with less loss.

The strawhood module 17 is detachably connectable to the rear of the separating module 30 and the framework 32 thereof is adapted to receive and mount the power source 11 on its upper end.

Turning now to the cleaning module 9, it should be noted that the cleaning module 50 shown in FIG. 1 is a more sophisticated configuration than the more simpler cleaning module 40 shown in FIGS. 2 to 5. It will be appreciated, however, that this simpler cleaning module 40 equally well fits under the threshing module 20 and separating module 30 as shown in FIG. 1 as described above.

Considering first the simpler cleaning module 40 shown in FIGS. 2 to 5, it will be appreciated that it basically comprises a mobile framework 41 of rectangular shape supporting the cleaning means 9. The rectangular framework 41 comprise a pair of fore-and-aft extending main beams 42 coupled to each other at their forward ends by a transverse wheel axle 43 supporting also at its opposite ends the traction wheels 12. A transverse rear beam (not shown) completes the rectangular framework 41 at the rear end thereof and pivotally supports at its central portion a steering wheel axle 44 which, in turn, supports at its opposite ends the steerable wheels 13. The framework 41 also supports combine propulsion means (not shown) which are operatively coupled to the traction wheels 12 to make the combine harvester mobile. The propulsion means is conventional and may be either of the mechanical or the hydraulic type.

The cleaning means 9 supported in the cleaning module 40, basically comprise a grain pan 45, a cleaning shoe with upper and lower cleaning sieves and a cleaning fan 47, as is generally conventional. The grain pan 45 is mounted on the framework 41 for generally back-and-forth oscillatory movement in the longitudinal direction of the machine generally below the threshing module 20. The grain pan 45 itself is conventional in design and therefore needs no further explanation. The grain pan 45 is operable to receive threshed grain from the threshing means 7 and the separating means 8 and to convey this threshed grain to the cleaning shoe which is disposed rearwardly thereof. The cleaning shoe, as already mentioned, normally comprises upper and lower cleaning sieves, only the upper one of which can be seen in the drawings at 46. The upper and lower cleaning sieves equally are arranged to oscillate back-and forth generally in the longitudinal direction of the machine to convey threshed grain therealong while subjecting it to a cleaning action. Preferably the upper sieve 46 and the grain pan 45 are oscillated in phase while that the lower sieve is oscillated with a phase difference of 180° relative to the upper sieve 46.

The cleaning fan 47 is mounted below the grain pan 45 and is disposed to direct a cleaning air blast through the threshed grain as it passes both from the grain pan 45 to the upper cleaning sieve 46 and along the sieves, whereby chaff and other impurities are made airborne for discharge from the combine harvester. Tailings are separated for discharge from the combine harvester. Tailings are separated from the clean grain for recycling as will be explained in greater detail below and clean grain is collected at the lower end of the cleaning means 9 whereafter it is conveyed through a conventional clean grain elevator (not shown) to the grain tank module 10 for temporary storage therein.

The tailings separated in the cleaning means 9 normally are recycled back to the threshing module 20 through a return conveyor module 90 for repeated threshing action. This return conveyor module 90 normally is an auger type conveyor which extends between the cleaning module 40 and the threshing module 20 along one side of both of said modules. The return conveyor module 90 is detachably connected at its receiving end to the transverse tailings collecting conveyor 91 which also is of the auger type and which extends beneath the cleaning means 9 and beyond one side thereof. The tailings return conveyor module 90 is provided with a thrower 92 at its discharge end which is adapted to throw tailings transversely across the width of the threshing module 20 at a location generally forwardly of the threshing cylinder 23.

Alternatively, the tailings return conveyor module 90 may comprise a separate tailings rethresher means for rethreshing the tailings as they pass through the return conveyor module and in which case, the tailings no longer have to recycle back to the threshing module 20. In this case, the tailings return conveyor module has its discharge end positioned at a level slightly above the grain pan 45 in a manner to recycle rethreshed tailings back through the cleaning means 9 in the cleaning module 40. A tailings rethresher and return conveyor of this type is shown and described in more detail in Great Britain Pat. No. 2,051,541, the content of which is incorporated in the present disclosure by reference.

When all modules described so far are assembled together, the combine harvester is not yet complete to the extent that drives, shieldings and eventual operational attachments still should be installed. These components have not been shown in the drawings for the sake of clarity of the disclosure. The drives, which usually are of the mechanical type such as belt or chain drive transmission, extend alongside the various modules and often overlap two or more modules. Drive transmissions which extend between components of only one module, of course, may be installed during the assembly of this specific module, i.e., prior to the putting together of the various modules to form a combine. Shieldings may overlap two or more modules. Optional attachments, as a straw chopper mounted within the strawhood 17, can be added to the combine at a convenient time, such as upon delivery to the end user.

A combine harvester comprising the threshing module 20 and the separating module 30 as shown in FIG. 1 and the cleaning module 40 as shown in FIGS. 2 to 5 may be considered as a "standard" or fully "conventional" type of combine, which may be the ideal machine for harvesting in brittle straw conditions on level terrain and where the demand for capacity is moderate and the cost price of the machine is a limiting factor for the end user.

It will be appreciated that the modules may be available in a range of widths so as to enable the manufactuer to offer a range of "conventional" type of combines. As an example, the separating module 30 may come with 3, 4, 5 or 6 transversely disposed straw walkers 31 and four straw elevator modules 6, four threshing modules 20 and four cleaning modules 40 of corresponding widths may come along therewith to match with these separating modules 30 of different widths. Along therewith, a range of engines may also be made available.

Returning to the cleaning module 40, it is noted above that the cleaning means 9 may be more sophisticated than those shown in the FIGS. 2 to 5. It will be appreciated by one skilled in the art that between the grain pan 45 and the cleaning shoe a pre-cleaning sieve and intermediate grain pan may be provided. Also the cleaning fan may be of a different type and have more than one outlet. Such components are shown and described in Great Britain Pat. No. 2,063,037, the disclosure of which is incorporated herein by reference.

All cleaning means described so far as particularly adapted to operate on level terrain. When operated in hilly conditions, the cleaning capacity of such cleaning means is greatly reduced and, moreover, unacceptable grain losses are likely to occur. For these hilly conditions, the "standard" cleaning module 40 can be replaced with a self-compensating cleaning module 50, which is operable to compensate for the adverse influences on the cleaning function of operation in hilly conditions.

Various approaches have been proposed in this respect. One such approach is shown in German Patent No. 3,332,763 following which the cleaning sieves and the grain pan are arranged to oscillate back-and-forth in a direction which deviates from the longitudinal direction of the machine, this deviation depending on and corresponding to the direction and the degree of the slope of the field on which the combine is operating. The arrangement is such that grain to be cleaned on the grain pan and the sieves is urged in the direction of the higher side of the cleaning means in an attempt to maintain an even loading of the cleaning means across the transverse width thereof. As is known in the art, unless special precautions are taken, operation on hillsides always results in an uneven loading of the cleaning means with the lower side thereof being overloaded. This is the reason for the reduced cleaning capacity as well as for the unacceptable grain loss level.

Another approach to overcome this problem of operation in hilly conditions is shown in Great Britain Pat. No. 2,052,238, the disclosure of which is incorporated herein by reference. The same arrangement is schematically shown in FIG. 1. Basically, the cleaning means 9, i.e., the grain pan 45, the cleaning shoe with the sieves therein and the cleaning fan 47, are mounted on a pivot frame (not shown) which itself is mounted for pivotal movement around a fore-and-aft extending pivot axis relative to the cleaning module framework 51. The arrangement is such that, when the harvester is inclined transversely relative to the vertical due to operation on a slope, the pivot frame with the cleaning means thereon is pivoted in the opposite direction to assume a generally horizontal position as seen in the transverse direction of the machine. This leveling is obtained automatically by means of an inclinometer which is arranged to control the actuation of position control means for the pivot frame. This self-leveling of the cleaning means 9 is very effective to the extent that it neutralizes all adverse influences on the cleaning function of operation in hilly conditions.

As already mentioned, FIG. 1 shows this arrangement only very schematically. As a matter of fact, only the forward central bearing 53 and the pair of rearward bearing rollers 54 for movably supporting the pivot frame on the cleaning module framework 51 are shown. It will be appreciated that the framework 51 and particularly the main beams 52 thereof are shaped and dimensioned to accommodate the pivot frame therebetween. Thus this framework 51 is different from the framework 41 of the "standard" cleaning module 40. However, in any event, the framework 51 has its upper edges dimensioned and shaped so as to match with the threshing and separating modules 20,30 already described. The cleaning means 9 mounted within the pivot frame of the further cleaning module 50 may be identical to the cleaning means 9 in the standard"or first cleaning module 40.

While that in the preferred embodiment of the further cleaning module 50, the grain pan 45, the cleaning shoe with both cleaning sieves therein and the cleaning fan 47 all are mounted on the pivot frame for self-leveling operation as a unit, it will be appreciated that it is also possible to make only either one or both cleaning sieves self-leveling. Alternatively sections of the cleaning sieves may be made self-leveling. Following still another alternative, one or both cleaning sieves together with the grain pan may be made self-leveling. It will be evident that in all these alternative arrangements the pivot frame will have to be adapted accordingly. However, in any event the cleaning module framework always matches with the threshing module 20 and the separating module 30.

Figure 2:
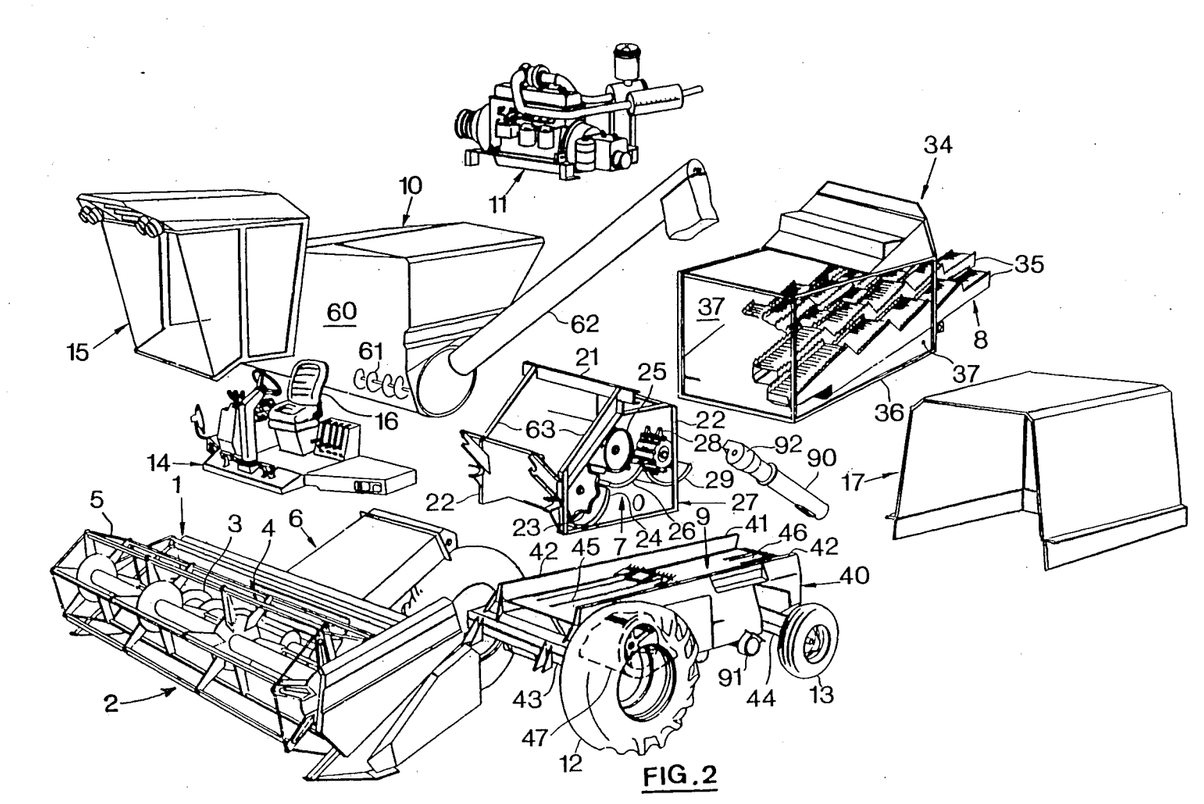
FIGS. 2 to 5 are views similar to FIG. 1 but showing different combinations of specific individual modules.

Turning now to FIG. 2, it will be seen that the threshing module 27 shown therein is slightly different from the module 20 shown in FIG. 1. This second threshing module 27 not only includes the threshing cylinder 23 and associated concave 24 together with the deflector beater 25 and the associated grate 26, but also includes a third rotatable element and an associated stationary element. This third rotatable element is a rethresher cylinder 28 which extends parallel to the threshing cylinder 23 and the beater 25 and is rotatable in the same direction. The stationary element is a rethresher concave 29 positioned at a small distance from the rethresher cylinder 28 so as to define a gap therebetween for the passage of crop material therethrough. As crop material is passed therethrough, it is subjected to a further threshing and separating action, whereby further grain is separated from the crop material through the rethresher concave 29 and is allowed to fall onto the cleaning means 9. Rethresher means as described hereabove have been shown and described in greater detail in Great Britain Pat. No. 1,318,071, the disclosure of which is incorporated herein by reference.

The individual components in the second threshing module 27 may be proportionally smaller than the first threshing module 20 so as to make sure that the point for discharging crop material from the threshing means 7 in both the first and second threshing modules 20,27 is situated at precisely the same location whereby the second threshing module 27 is interchangeable with the first threshing module 20 and matches with the first separating module 30 already described herebefore and shown in FIG. 1. The frameworks 21 of both threshing modules 20 and 27 have the same length.

Alternatively and indeed also preferably and as shown in FIG. 2, the threshing cylinder 23 and concave 24 together with the beater 25 and grate 26, as used in the second threshing module 27, may be identical to the corresponding components of the first threshing module 20, whereby the location of the discharge point of the threshing means in the second threshing module 27 (from the rethresher means 28,29) is different from the location of the discharge point of the threshing means 7 in the first threshing module 20 (from the beater 25 and grate 26). However, the frameworks 21 in both modules have the same length and should be identical, whereby in the combination of the first threshing module 20, cover plates are needed to close off the mounting holes in the side walls 22 for the rethresher shaft and the rethresher concave mounting pins.

It will be appreciated that the first separating module 30 shown in FIG. 1 will not match with the preferred version of the second threshing module 27 to the extent that, when both modules were assembled on either a first or further cleaning module 40, respectively 50, the straw walkers 31 thereof would interfere with the rethresher means 28,29. Accordingly, a second separating module 34 with shorter straw walkers 35 is available for combining with the aforementioned version of the second threshing module 27. When both the second threshing module 27 and the second separating module 34 are mounted on any one of the cleaning modules 40 or 50, the straw walkers 35 have their forward ends positioned in crop receiving relationship to the discharge end of the rethresher means 28,29. When comparing the separating modules 30 and 34 as shown respectively in FIGS. 1 and 2, it will be seen that the straw walkers 31 of the first separating module 30 have six "steps" while that the straw walkers 35 of the second separating module 34 have only five "steps". It will also be noted that the straw walkers 35 of th second separating module 34 do not extend forwardly into the second threshing module 27. Instead the rethresher means 28,29 of the second threshing module 27 extend over a short distance within the second separating module 34.

Again the framework 36 of the second separating module 34 has the same width as the frameworks 21 and 41,51 of the first and second threshing modules 20 and 27, and the first and second cleaning modules 40 and 50 to permit the sidewalls 27 thereof to be detachably connected to both the side walls 22 and the main beams 42 or 52.

The use of the second threshing module 27 include the rethresher means 28,29 in combination with a separating module 34 of the straw walker type is recommended where the straw walkers of the "standard" combination are felt as the capacity limiting factor of the combine harvester and where there is a demand for a higher capacity. The rethresher means 28,29 indeed improve a greater extent the separating capacity of the threshing and separating means 7,8. This may be to the detriment of the straw quality as the rethresher means 28,29 should be recommended only when the straw to be harvested is somewhat tougher or less brittle. In any event, the combination with rethresher means 28,29 is still very much less aggressive to the straw than the rotary separating means known today. Furthermore, as far as cost is concerned, the combination including the rethresher means 28,29 still may be considered to belong to the lower range.

Figure 3:
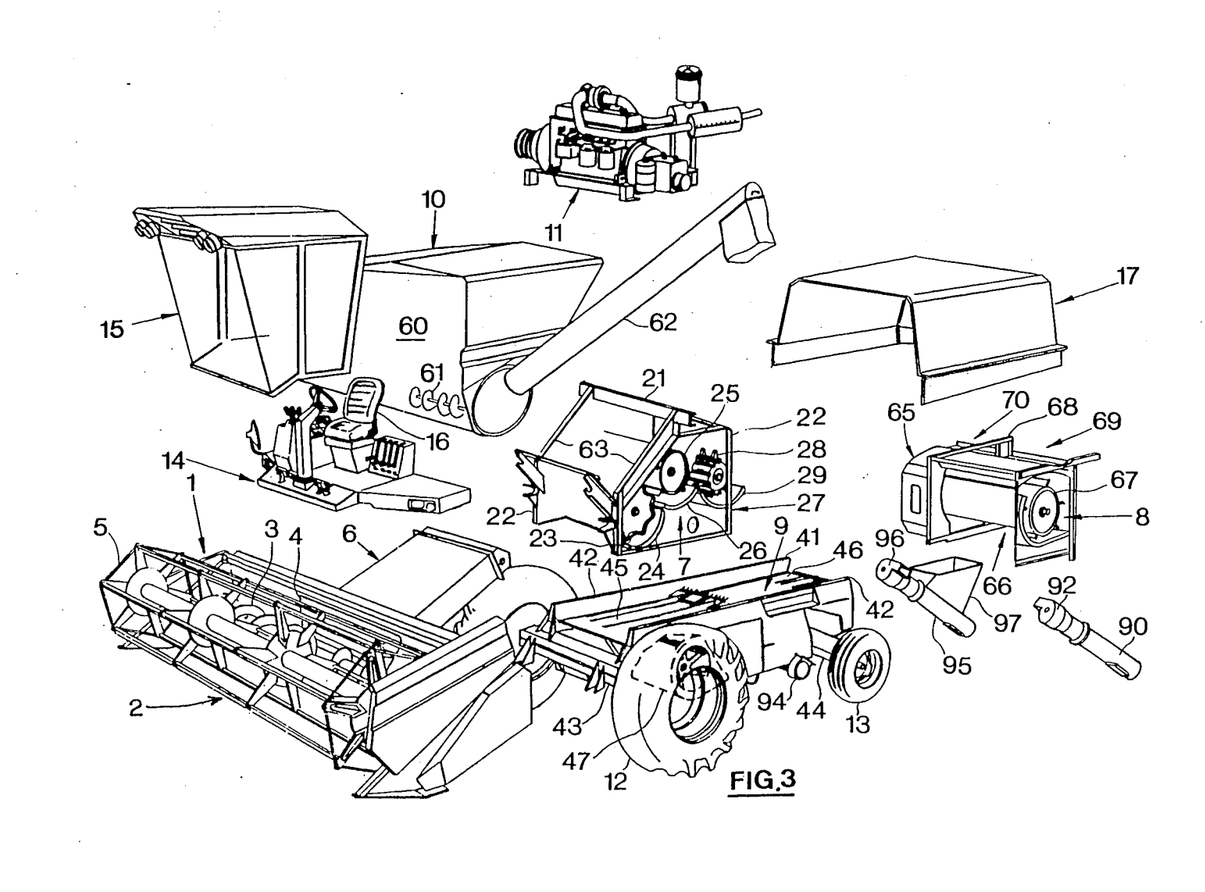

Turning now to FIG. 3, it will be noticed that the combination shown therein is basically the same as the combination shown in FIG. 2, except that the second separating module 34 of FIG. 2 is replaced by a third separating module 65 which is of the rotary type. The rotary separating means 8 therein are of the single flow type and as such are of an offset design with an inlet 66 at one end for communications with the rethresher means 28,29 and an outlet (not shown) at the other end. These rotary separating means 8 comprise a separating rotor 67 surrounding by a separating housing including separating concaves (not shown). These separating means 8 again extend parallel to the rotatable components in the threshing module 27 and the rotor 67 is rotated in the same direction as said threshing components.

The separating rotor 67 and associated separator housing have a width which exceeds the width of the threshing module 27 and the cleaning modules 40,50. The framework 68 of this third separating module 65 is such that, when mounted in a combine harvester, the separating means 8 have one end generally aligned with the corresponding sides of the threshing module 27 and of the cleaning module 40,50. The other end of the rotary separating means 8 thus extends beyond the corresponding other sides of the threshing module 27 and the cleaning module 40,50.

In operation, crop material is received from the rethresher means 28,29 through the inlet 66 and is conveyed spirally around the rotor 67 towards the offset outlet for discharge therethrough while subjecting said crop material to an aggressive separating action. Grain separated in the portion 69 of the separating means 8 overlying the cleaning module 40,50 is permitted to fall directly thereto. Grain separated in the portion of the separating means 8 offset from the cleaning module 40,50 is conveyed to this cleaning module via a further conveying module 95 which has a dual function to the extent that it also is operable to recycle half of the tailings separated in the cleaning means 9 back to the grain pan 45. With respect to this tailings recycling function, the module 95 is very similar to the conveyor module 90 already described and which in the combination presently under consideration is also being used. Indeed, the tailings collecting conveyor 94 in this combination is operable to convey half of the tailings separated in the cleaning module 40,50 to one side thereof and the other half of the tailings to the opposite side. The first conveyor module 90 including, as already described, a special tailings rethresher, is provided at one side of the cleaning module 40,50 and is operable to rethresh and recycle one half of the tailings back to the grain pan 45. The further conveyor module 95 is provided at the other side of the cleaning module 40,50 and equally includes a special tailings rethresher. This further conveyor module 95 is connected to the corresponding end of the tailings collecting conveyor 94 and also has at its discharge end a thrower means 96 which is arranged to spread recycled material transversely across the width of the grain pan 45.

The further conveyor module 95 also has a receiving trough 97 intermediate its ends and which is coupled to the underside of that portion of the separating means 8 which extend beyond the corresponding side of the cleaning module 40,50 for receiving grain which is separated therein and for conveying said grain, together with rethreshed tailings, to the grain pan 45 for subjecting it to a cleaning action. A conveyor module of this type is shown in more detail in Great Britain Patent No. 2,051,541, the disclosure of which is incorporated herein by reference.

The straw hood 17 which matches with the third separating module 65 is somewhat different from the straw hood 17 which matches with the straw walker type separating modules 30,34.

The combination illustrated in FIG. 3 forms a so-called "rotary" combine and is particularly attractive when the separating module 65 is combined with relatively narrow threshing and cleaning modules 27,40,50. Such a combination forms a relatively low cost rotary combine which nevertheless has an exceptionally high capacity especially when harvesting corn. This combination, therefore, typically is a corn combine although, as will be appreciated, it also can handle other crops.

Figure 4:
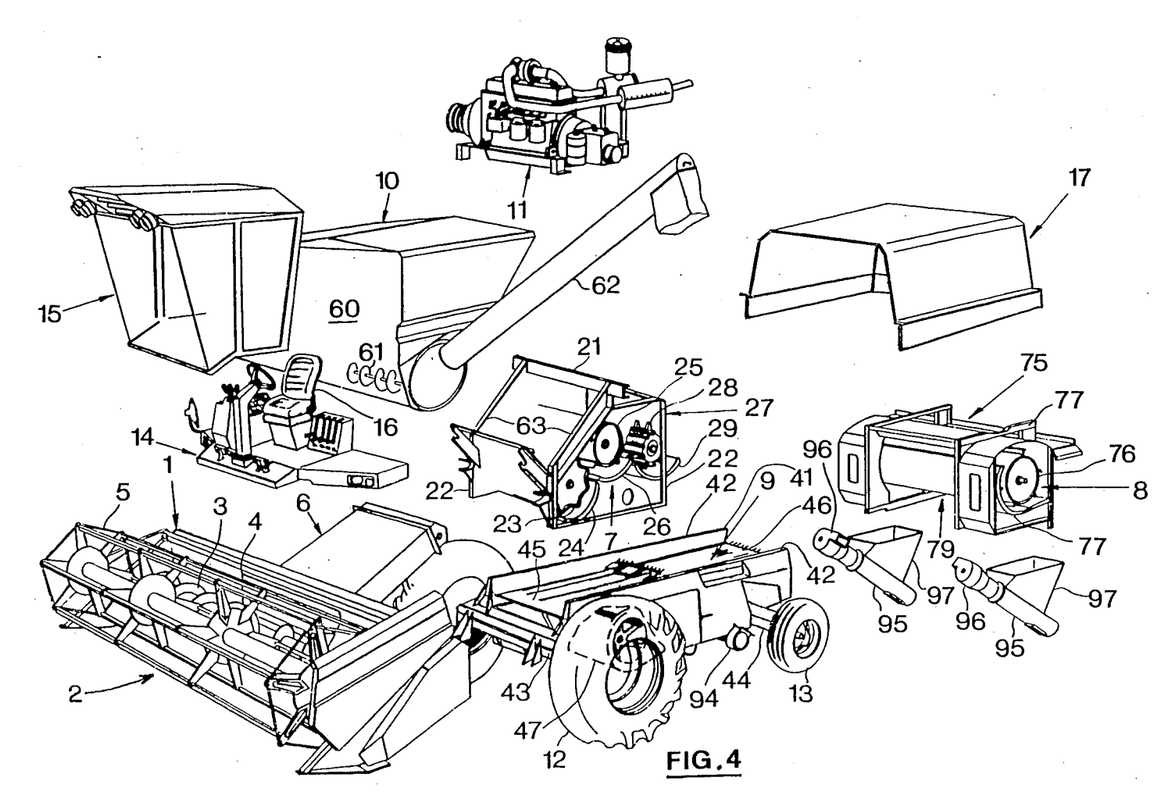

Turning now to FIG. 4, it will be noticed that, in comparison with FIG. 3, basically only the third separating module 65 has been replaced by a fourth separating module 75 which again is of the rotary type. A separating rotor 76 is provided which extends parallel to the rethresher cylinder 28 in the threshing module 27 and which is rotatable in the same direction as this rethresher cylinder 28. The separating rotor 76 is mounted within a separating housing comprising separating concaves 77. The separating means 8 have a greater width than the threshing module 27 and the cleaning module 40,50 with which it is to be combined.

However, in this combination the separating means 8 are fully symmetrical relative to the fore-and-aft vertical plane of symmetry of the combine harvester. In other words, the threshing module 27 and the separating module 75 have a common fore-and-aft vertical plane of symmetry. Accordingly, the separating module 75 extends an equal length beyond each side of the threshing module 27 and the cleaning module 40,50. The framework 78 nevertheless is dimensioned and positioned so as to be detachably connectable to the side walls 22 of the threshing module 27 and to the main beams 42,52 of the cleaning module 40,50.

The separating housing has a central forwardly facing inlet 79 of substantially the same width as the threshing module and which is positioned to communicate therewith. The layer of crop material is received from the rethresher means 28,29 through the inlet 79 whereafter it is divided in two generally equally sized halves by layer dividing means (not shown) provided generally at or proximate to the fore-and-aft plane of symmetry. The separating means 8 further are operable spirally to convey said halves in opposite directions around the rotor 76 towards its opposite ends for ultimate discharge through outlets (not shown) at these ends. During these spiral movements through the separating means 8, the crop material is subjected to an aggressive separating action.

Grain separated in the central portion of the separating module 75 is allowed to fall directly to the cleaning module 40,50. Grain which is separated in the portions of the separating module 75 extending beyond the respective opposite sides of the cleaning module 40,50 is conveyed to the grain pan 45 by dual purpose conveyor modules 95 identical to the conveyor module 95 already described in the combination according to FIG. 3 and which thus not only convey said separated grain to the grain pan 45 but also recycle tailings in the cleaning means 9. One such conveyor module 95 is provided on each side of the cleaning module 40,50 which means that this cleaning module 40,50 in this combination, also has a tailings collecting conveyor 94 which conveys half of the tailings in one direction and the other half in the other direction. The combination of the threshing means 7 and the separating means 8 as used in the combination of FIG. 4 has been shown and described in greater detail in G.B. No. 2,063,039, the disclosure of which is incorporated herein by reference.

Figure 5:
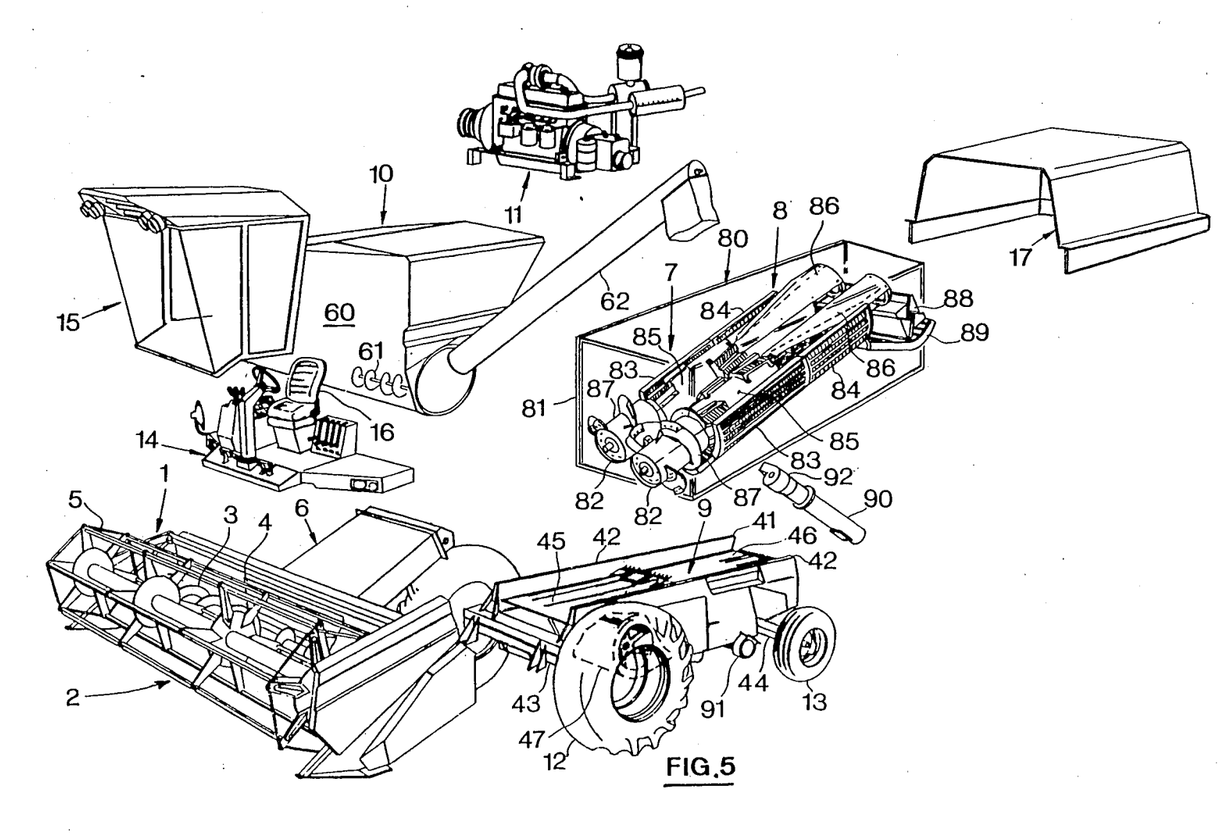

The fourth separating means 75 described hereabove may be combined with relatively wide threshing and cleaning modules 27,40,50 so as to form a truely high capacity rotary combine with a particularly aggressive separating action and which can cope without any difficulties with crops having a high moisture content such as often is the case with corn. However, this type of rotary combine also has a very high throughput capacity in so-called "small grains" such as wheat. This type of rotary combine can handle quite easily tough crop conditions which sometimes present problems to the axial flow type rotary combines (FIG. 5). Thus, the combine illustrated in FIG. 4 is a "top of the range" combine for which cost is less critical.

Returning once more to the combinations illustrated in both FIGS. 3 and 4, it will be appreciated that the threshing modules therein preferably are of the type that include the rethresher cylinder 28 and concave 29, although it also will be appreciated that the separating modules 65 and 75 nevertheless also may be combined with a threshing module having no such rethresher means 28,29, such as the threshing module 20.

Turning now finally to FIG. 5, it will be noticed that the various threshing and separating modules 20,27 respectively 30,34,65,75 as shown in FIGS. 1 to 4 have been replaced by a single module 80 comprising combined threshing and separating means 7,8 of the axial flow type. The framework 81 thereof again has a width which corresponds to the width of the cleaning module 40,50 to which it is attachable. This framework 81 further also is adapted to support at its upper end the grain tank module 10 and rearwardly thereof the power source 11. The operator's station module 14 and the straw elevator and header combination 6,1 are coupled to the forward end of this combined threshing and separating module 80 and the straw hood 17, which again may be of a different shape and dimension, is attachable to the rear end thereof.

The threshing and separating means 7,8 comprise at least one rotor 82 which is rotatably mounted within a corresponding housing including at least one threshing concave 83 and one separating concave 84. The at least one threshing and separating rotor 82 is rotatable around a generally fore- and-aft extending axis and comprises a threshing section 85 forwardly of a separating section 86. The rotor 82 also is provided with a feeder section 87 forwardly of the threshing section 85 for receiving the layer of crop material from the straw elevator 6 and for changing its path of movement from a generally rectilinear path in the straw elevator into a generally spiral path in the threshing and separating means 7,8 and extending therealong from front to rear. As crop material is conveyed spirally through the threshing and separating means, it is subjected to an aggressive threshing and separating action.

Preferably two threshing and separating rotors 82 are provided in corresponding housings in parallel relationship relative to each other. The feeder sections 87 in this case, are operable to divide the crop layer received from the straw elevator 6 in two substantially equally sized halves, one of which spirally is conveyed around one rotor 82 and the other one of which spirally is conveyed around the other rotor 82.

Generally, at the rear end of the rotors 82, a discharge beater 88 and corresponding grate 89 are provided; the beater 88 being rotatable around a transversely extending axis. The discharge beater and grate 88,89, in operation, receive threshed crop material (straw) from the rotors 82 and discharge it rearwardly through the strawhood 17. As this crop material is passed across the beater grate 89, it is subjected still to a final separating action. Grain separated through the threshing and separating concaves 83,84 and through the beater grate 89 is allowed to fall directly to the cleaning module 40,50 therebelow.

As the combined threshing and separating module 80 has the same width as the cleaning module 40,50 therebelow, there is no need for a conveyor module 95 of the type as described with reference to FIG. 4 for conveying separated grain to the cleaning means 9. For recycling tailings separated in the cleaning means 9 a conveyor module 90 of the type as described with reference to FIG. 1 is provided.

A combine harvester embodying the combined threshing and separating means as used in the combination according to FIG. 5 is shown and described in Great Britain No. 1,399,601, the disclosure of which is incorporated herein by reference. The combination as shown in FIG. 5 typically is a high capacity rotary combine, which is particularly appealing for use in dry crop conditions, which is more "straw friendly" than the rotary combine illustrated in FIG. 4, and which produces a clean grain sample found to highly desirable in certain areas of the world. This particular combination has been found to be a typical high capacity corn combine.

In general, it thus will be appreciated that the invention enables the manufacturer to offer a wider range of combines with a relatively small number of parts and at an "acceptable" cost. Thus, greater flexibility is provided to meet the customer's demand. Also the invention facilitates the application of the principles of "model mix" by the manufacturer during assembly. Fewer spare parts have to be stocked at the manufacturer and dealer levels and less dealer training is required.

It will be understood that changes in the details, materials, steps and arrangements of parts, which have been described and illustrated to explain the nature of the invention, will occur to and may be made by those skilled in the art upon a reading of this disclosure within the principles and scope of the invention. The foregoing description illustrates several embodiments of the invention; however, concepts, as based upon the description may be employed in other embodiments without departing from the scope of the invention.

Having thus described the invention, what is claimed is:

1. In a combine harvester having a threshing means for receiving crop material from the field and threshing and separating grain therefrom; separating means positioned proximate to said threshing means to receive threshed crop material therefrom and further separate grain from the remaining crop material; cleaning means positioned in operative communication with said threshing means and said separating means to receive grain therefrom, said cleaning means being operable to clean unwanted debris from the threshed and separated grain, the improvement comprising:

each of said threshing means, said separating means and said cleaning means being formed as an independent module interchangeable with a like module having a different component configuration, each said module including an independent frame detachably connectable to the frame of the adjacent said modules.

2. The combine harvester of claim 1 wherein said module frames have substantially identical transverse widths.

3. The combine harvester of claim 2 wherein said threshing and separating modules are mounted above said cleaning module, said threshing module being positioned forwardly of said separating module.

4. The combine harvester of claim 34 wherein said threshing and separating modules can be collectively replaced by an axial flow module, including at least one longitudinally extending rotor having a threshing section and a separating section operable to discharge grain to said cleaning module.

5. The combine harvester of claim 5 wherein a first threshing module includes a transversely extending threshing cylinder and cooperable concave and a transverse deflector beater and associated beater grate positioned rearwardly of said threshing cylinder and cooperable concave in crop material flow communication therewith.

6. The combine harvester of claim 6 wherein said first threshing module is interchangeable with a second threshing module including a transversely extending threshing cylinders and cooperable concave, a transverse deflector beater and associated beater grate positioned rearwardly of said threshing cylinder and cooperable concave in crop material flow communication therewith, and a rethresher cylinder and associated concave positioned rearwardly of said deflector beater and associated beater grate in crop material flow communication therewith.

7. The combine harvester of claim 6 wherein said separating module includes straw walkers positioned to receive threshed crop material from said threshing module.

8. The combine harvester of claim 6 wherein said separating module includes a rotary separating rotor and a corresponding separating concave, said separating rotor being positioned to receive threshed crop material from said threshing module.

9. The combine harvester of claim 7 wherein said cleaning module includes a grain pan positioned to receive grain from said threshing module and from said separating module, a cleaning shoe having at least one cleaning sieve to receive grain from said grain pan to permit the cleaning of unwanted debris therefrom, and a cleaning fan operably positioned to blow air through said at least one cleaning sieve.

10. The combine harvester of claim 9 wherein said cleaning module further includes a self-leveling subassembly supporting said at least one cleaning sieve to maintain said at least one cleaning sieve in a horizontal orientation whenever said harvester is transversely inclined.

11. The combine harvester of claim 9 further comprising a grain storage tank supported from said threshing module frame.

* * * * *